G. C. PHILLIPS.
Steam-Packing.
No. 222,074. Patented Nov. 25, 1879.
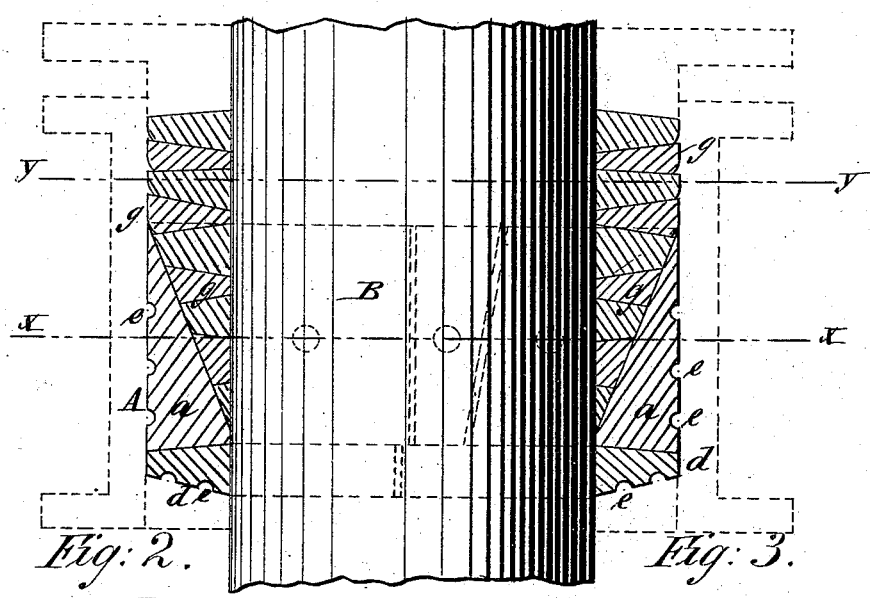
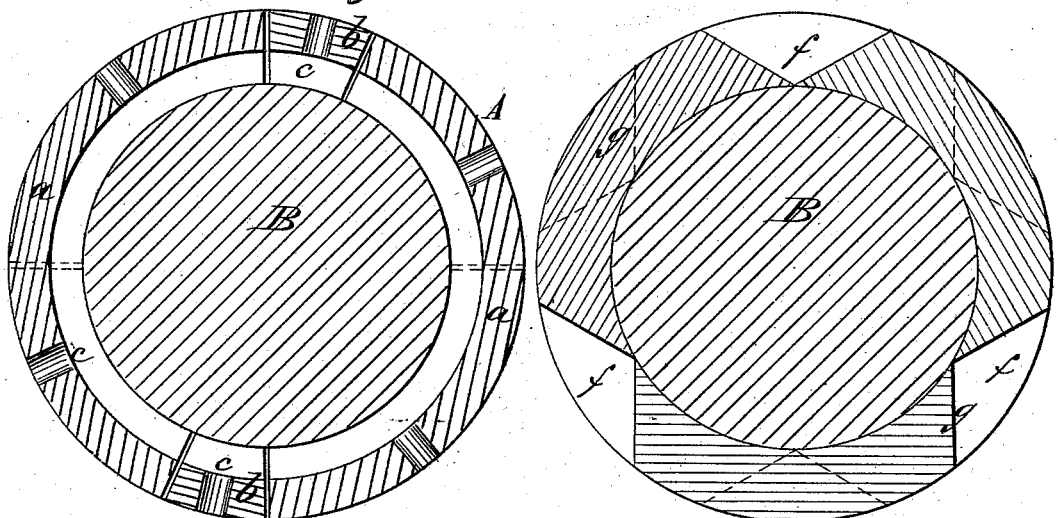
WITNESSES:
Achilles Schehl.
C. Sedgwick
INVENTOR:
G. C. Phillips
BY Munn & Co
ATTORNEYS.

UNITED STATES PATENT OFFICE.

GEORGE C. PHILLIPS, OF SILVER CITY, NEVADA.

IMPROVEMENT IN STEAM-PACKING.

Specification forming part of Letters Patent No. 222,074, dated November 25, 1879; application filed September 19, 1879.

*To all whom it may concern:*

Be it known that I, GEORGE C. PHILLIPS, of Silver City, in the county of Lyon and State of Nevada, have invented a new and Improved Steam-Packing, of which the following is a specification.

The object of this invention is to produce sectional packings for the stuffing-boxes of steam-cylinders, air-chambers, &c., capable of expansion inwardly and outwardly to pack both the piston-rod and box and to compensate for wear.

Piston-rod packings have heretofore been made of segmental packing-rings fitted within a conical sleeve, whereby the pressure of the gland upon the rings caused them to pack tightly around the piston. Such construction is shown in the Letters Patent granted to me June 10, 1879; and my present invention is an improvement with the objects named.

The present invention consists in making the packing-rings with their adjoining faces inclined in opposite directions, so that the pressure of the gland will compress and expand the packing-rings alternately to pack the piston and stuffing-box, such rings being used in connection with a conical sleeve of novel construction, which sits within the stuffing-box and around the piston-rod.

These features will be more particularly explained, with reference to the accompanying drawings, wherein—

Figure 1 is a longitudinal section of the improved packing as applied to a piston. Fig. 2 is a cross-section on line $x$ $x$ of Fig. 1. Fig. 3 is a cross-section on line $y$ $y$.

Similar letters of reference indicate corresponding parts.

A is the conical sleeve, having a cylindrical periphery and a conical bore. The exterior diameter of the sleeve equals that of the stuffing-box, while the inner, at the inner end, is nearly the same as piston-rod B, and widens to the diameter of the stuffing-box at the outer end.

The sleeve A is divided longitudinally into two equal portions, $a$ $a$, and the two small wedge-shape pieces $b$ $b$, which lie between the ends of the portions $a$. The smaller ends of pieces $b$ are inward, and they are for the purpose of facilitating the removal of the sleeve from the stuffing-box. There are holes $c$ in the sections $a$ and $b$ for the insertion of a suitable tool to remove them, the pieces $b$ being first withdrawn.

$d$ $d$ are semi-annular pieces, which are placed in the bottom of the stuffing-box, beneath sleeve A, and have their inner surface beveled, as shown, to fit closely in the dished bottom of the stuffing-box. The outer surface of $d$ $d$ and the contiguous lower end of sleeve A are each beveled from their inner periphery toward the inner end of the stuffing-box, so that the inward pressure upon the sleeve A applied by the gland will cause the packings $d$ to bind tightly upon the piston-rod, and at the same time the sections of sleeve A are pressed against the walls of the stuffing-box, and escape of steam prevented at either side. In the under side of sections $d$ and on the periphery of sleeve A grooves $e$ are made, which form spaces for water, to prevent the packing from fusing.

The segmental packing-rings are placed around the piston B, within and at the end of sleeve A. These rings are made in three portions, which are not completely triangular, space being left for their contraction, and their peripheries are formed with recesses $f$, as in the patent before mentioned, in which recesses the water of condensation will collect and prevent fusing of the packing.

The sleeve A extends only about one-half the length of the stuffing-box, the space at the end of A being filled out by the rings $g$, which are of the full diameter of the stuffing-box, and are formed with their peripheries square, to fit the stuffing-box. The rings $g$ within A fit closely to the conical surface thereof. The rings $g$ lie upon each other, and their adjacent surfaces are inclined or beveled in opposite directions alternately, so that the pressure applied by the gland or follower will force the rings $g$ inward and outward alternately, to pack both the piston and the stuffing-box. Any extra pressure of steam from the inner end will also have the same effect, instead of lifting the rings bodily, as is the case with flat rings.

The rings $g$ will be inserted with the joints of the sections broken or out of line.

In Fig. 1 a stuffing-box and gland or follower are shown, by dotted lines, in connection with the packing.

Having thus described my invention, what I claim as new, and desire to secure by Letters Patent, is—

The combination, with steam-tight wedge-pieces $g$, having beveled surfaces, of the conical sleeve A, made in sections, the wedge-shaped pieces $b$, and the base-ring $d$, arranged to break joint at their lines of division, all constructed substantially as shown and described.

GEORGE CROWAN PHILLIPS.

Witnesses:
  GEORGE COMTE,
  JNO. W. GRIER.